May 15, 1962 J. H. WEBB 3,034,274
DEMOUNTABLE CUTTER BAR STRUCTURE FOR TRACTOR
Filed June 30, 1960 2 Sheets-Sheet 2

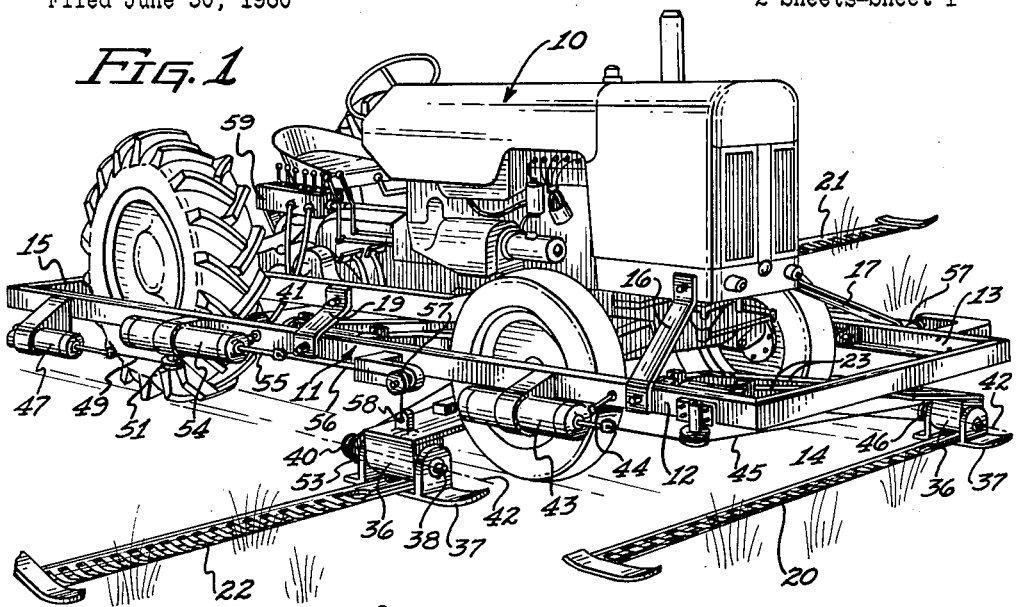

INVENTOR.
JOHNATHAN H. WEBB.
BY
Willard S. Grout
ATTORNEY.

3,034,274
DEMOUNTABLE CUTTER BAR STRUCTURE FOR TRACTOR
Johnathan H. Webb, Lakeside, Ariz.
Filed June 30, 1960, Ser. No. 39,941
1 Claim. (Cl. 56—6)

This invention pertains to improvements in mowing machine apparatus and more particularly to improvements in a demountable cutter bar structure for use with tractors.

One of the objects of this invention is to provide an improved cutter bar structure by which a plurality of cutter bars may be quickly and easily attached to or removed from a tractor.

Another object of this invention is to provide an arrangement of a plurality of cutter bars on a common frame to facilitate placement and removal of the cutter bar assembly on a tractor.

Further features and advantages of this invention will appear from a detailed description of the drawings in which:

FIG. 1 is a general perspective view of a tractor having the demountable cutter bar structure incorporating the features of this invention attached thereto.

FIG. 2 is a plan view of the apparatus shown in FIG. 1.

Figure 4:
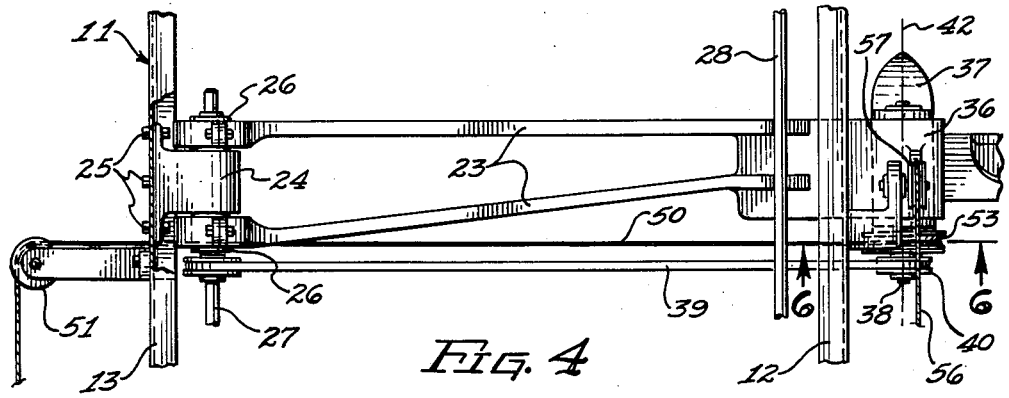
FIG. 4 is an enlarged fragmentary plan view of the apparatus shown in FIG. 3.
Figure 3:
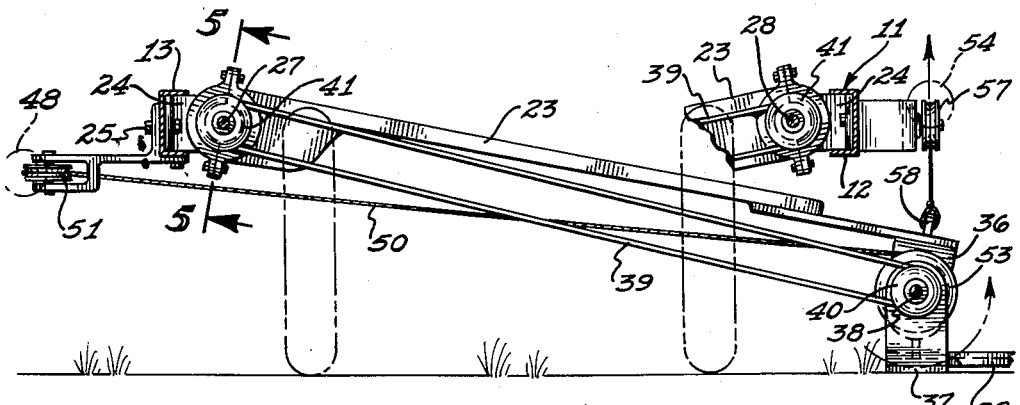
FIG. 3 is an enlarged transverse section on the line 3—3 of FIG. 2.

As an example of one embodiment of this invention there is shown a cutter bar structure for a tractor 10 comprising a frame 11 consisting of the side rails 12 and 13 and the front rail 14 and rear rail 15 forming an integral structure demountably secured to the tractor 10 by suitable brackets 16, 17, 18 and 19. Substantially all of the operative mechanisms of the cutter bar apparatus is mounted on this demountable frame 10.

Figure 5:
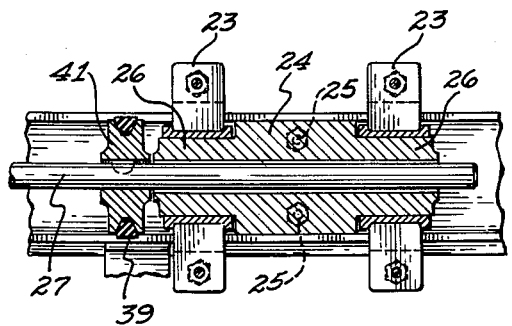
FIG. 5 is an enlarged fragmentary section on the line 5—5 of FIG. 3.
Figure 6:
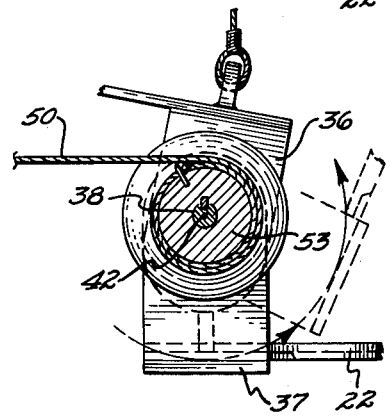
FIG. 6 is an enlarged fragmentary section on the line 6—6 of FIG. 4.

A plurality of cutter bars, comprising the front cutter bar 20, the left cutter bar 21, and the right cutter bar 22, are provided on the frame and preferably may take the form of my earlier Patent 1,656,090 of Jan. 10, 1928. Each of the cutter bars 20, 21 and 22 are carried on suitable hangers 23 each of which are pivotally mounted on the frame 10 by means of journal boxes 24, as best shown in FIG. 5, having bolts 25 rigidly securing the boxes to the frame and including trunnions 26 upon which the hangers are journalled. Drive shafts 27 and 28 are journalled in the boxes 24, with drive shaft 27 additionally supported in a suitable support bracket 29 fixed to the side rail 13 of the frame 10. Each of these shafts are driven from the usual power take-off shaft 30 of the tractor 10 through the dual pulley 31 fixed thereto. Belts 32 and 33 operating over the pulley 31 drive the respective pulleys 34 and 35 fixed on the shafts 27 and 28.

Each of the cutter bars are reciprocated by suitable mechanism such as shown in the aforementioned Patent 1,656,090 housed in the casings 36 having the ground shoes 37. Since the detailed structure of the trunnion mechanism in these casings 36 forms no specific part of this invention, further detailed description thereof will not be made herein except to point out that the input shafts 38 of each casing are driven from belts 39 connected to pulleys 40 fixed on said input shafts which belts 39 in turn operate over the pulleys 41 on the shafts 27 and 28.

Each of the cutter bars 20, 21 and 22 are pivotally mounted on the casings 36 to swing about the horizontal axes 42. Cutter bar 20 is swung about axis 42 of its casing 36 by a fluid pressure cylinder 43 fixed to the frame 10 and having a piston rod 44 connected to pull cable 45 wrapped around a cable drum 46 fixed to the ground shoe 37 associated with the cutter bar 20. Similarly, cutter bars 21 and 22 are swung up and down by the respective cylinders 47 and 48, the cables 49 and 50 passing over idler pulleys 51 journalled on the frame 10, the ends of the cables 49 and 50 being wrapped around the cable drums 52 and 53 of the respective ground shoes of the cutter bars 22 and 21.

The hangers 23 are raised and lowered for the desired height of cut by the cylinders 54 carried on the frame 10 having piston rods 55 connected to pull cables 56 passing over idlers 57 journaled on the frame 10 downwardly from which extend the cables to dead-end in the eyelet brackets 58 of each of the casings 36 so that the hangers 23 may be swung up and down on the trunnions 26. A suitable fluid pressure control valve bank 59 may be provided for the individual or simultaneous control of the cylinders 43, 47, 48 and 54 as desired.

It is to be further noted that the rear rail 15 may be made demountable at the rear corners 60 of the side rails 12 and 13 so that when the frame 10 is lowered from the tractor and flat on the ground with the hangers 23 and cutter bars 20, 21 and 22 lying flat on the ground the front wheels of the tractor may enter from the rear between the side rails, rolling lightly over the hangers 23 to come to the pickup or release position of the tractor 10 shown in broken lines in FIG. 2, for installing or releasing the frame 10 and its associated mechanism from the tractor. This provides a one-way operation in which only the bracket 16—19, the belts 32—33, and fluid lines from the control valve banks to the fluid supply or the tractor need be manipulated.

While the apparatus herein disclosed and described constitutes a preferred form of the invention it is also to be understood that the apparatus is capable of mechanical alteration without departing from the spirit of the invention and that such mechanical arrangement and commercial adaptation as fall within the scope of the appendent claims are intended to be included herein.

Having thus fully set forth and described this invention what is claimed and desired to be obtained by United States Letters Patent is:

A demountable cutter bar structure for a tractor comprising in combination:
(a) a rectangular frame having,
(b) a pair of laterally spaced side rails adapted to be located along and outside of the wheels and frame of the tractor,
(c) a front rail fixed to the front ends of said side rails positioned in the front of said tractor,
(d) a rear rail demountably attached to the rear ends of said side rails positioned in back of said tractor,
(e) brackets on said side rails adapted to secure said frame to the tractor,
(f) a plurality of cutter bars pivotally mounted on said side rails extending laterally outwardly from said frame for vertical lateral swinging movement and up-and-down height positioning movement relative to said frame,
(g) power actuating cylinders fixed on said side rails energizable to cause said swinging and up-and-down movements of said cutter bars, (h) a power transmission supported on said side rails connected to actuate said cutter bars in reciprocatory cutting movement,
(i) and demountable power transmission means for connecting power from the tractor to actuate said cylinders and said power transmission.

References Cited in the file of this patent
UNITED STATES PATENTS 2,150,350    Vargas               Mar. 14, 1939
2,861,409    Kosch et al.          Nov. 25, 1958